Sept. 9, 1941.  E. H. LANGE  2,255,389
MOTOR VEHICLE STARTING POWER CONTROL SYSTEM
Filed Dec. 19, 1938
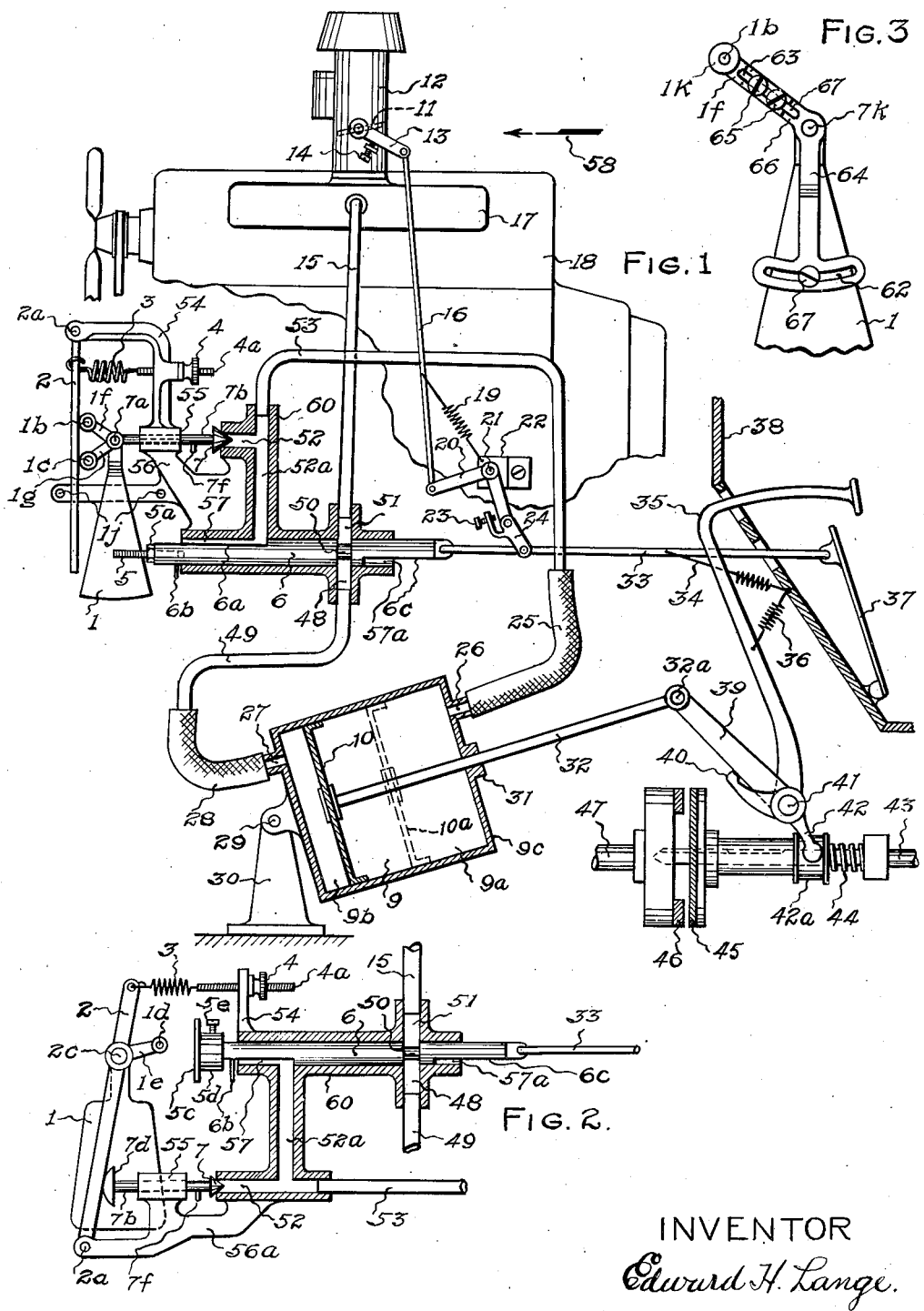
INVENTOR
Edward H. Lange.

Patented Sept. 9, 1941

2,255,389

UNITED STATES PATENT OFFICE 2,255,389

MOTOR VEHICLE STARTING POWER CONTROL SYSTEM

Edward H. Lange, Baltimore, Md.

Application December 19, 1938, Serial No. 246,568

15 Claims. (Cl. 192—.01)

This invention relates to control systems for starting motor vehicles, with particular reference to control systems for smoothly starting a motor vehicle, without the customary effort and technique required in judging appropriate application of vehicle-motive power to the driving side of the clutch while simultaneously exerting substantial effort against clutch engaging springs to gradually engage the clutch, and in relation to the actual accelerating results upon the vehicle which eventuate, as well as in relation to the grade-modified load conditions of the vehicle.

The present invention is therefore directed to the provision of relatively simple means serving to determine the amount of power initially applied from the vehicle-propelling engine to the driving side of the clutch in starting the vehicle, in relation to the grade-modified load conditions of the vehicle, in addition to serving to limit the amount of vehicle acceleration produced in starting to a comfortable magnitude, and to eliminate the substantial effort of manually opposing clutch engaging springs.

Another object of this invention, is to provide a simple inertia governor means effectively regulating clutch engaging movements, utilizing to maximum advantage response of the inertia governor means to both vehicle inclination and vehicle acceleration, the former response frequently vitiating the utility of hitherto disclosed clutch control systems employing a vehicle responsive inertia member for controlling vehicle acceleration in starting, and rendering said hitherto disclosed devices ineffective under starting conditions frequently encountered in practice.

Another feature of the present invention is the ability of the simple means here disclosed to accomplish the required function not only when starting the vehicle forward upon a level and when starting backward upon a level, but also when starting forward upon an up-grade and when starting backward upon an up-grade.

Still another important feature of this invention is the means whereby the clutch checking operation of the sufficient pre-established cylinder pressure in 9a is continuously and positively controllable by accelerator or by the clutch control member controlling the power actuator of the clutch, and whereby the inertia governor is a subsidiary control, for checking clutch engaging movement and for determining vehicle-motive power initially applied to the driving side of the clutch in starting, responsively with the amount of forward and rearward elevation of the vehicle. It will be noted that the pressure in 9a, is pre-established before clutch closure, and sufficient for checking at subsequent positions of the clutch toward complete closure, immediately upon closure of the throttle-valve 7, either by direct control upon the accelerator pedal 37, or by control exerted by the pendulum 1; this important feature differs from hitherto disclosed devices, in which either no positive control of clutch checking during clutch closure is present upon the accelerator pedal, or in which inertia devices act only to close off a cylinder-volume such as 9a, preliminary to establishment of the necessary pressure for holding the clutch, and thus established only by considerable further closing of the clutch, after clutch-checking is called for. Also, in the device here disclosed, a small retraction of the accelerator pedal is sufficient to check further clutch closure; it is unnecessary to slow the engine down to the idling position to check further clutch closure.

Other objects of the invention and desirable details of construction, will become apparent and be better understood from the following discussion further pointing out the novelty of this invention, including the accompanying drawing and description, and are further pointed out in the appended claims.

In devices for controlling the engaging movement of a clutch for starting a motor vehicle, and employing inertia, as hitherto disclosed, such devices where responsive at all to the accelerator of the engine either initiate a clutch engaging operation responsive to a fixed engine speed, as for example centrifugal devices, or what is substantially the same, in response to a fixed amount of movement of the accelerator, and take no account of the actual load conditions of the vehicle in starting, either upon a level or upon an up-grade, to secure smooth starting of the vehicle. As previously indicated herein, the customary effort and technique of starting a vehicle smoothly where such devices are not used, does of necessity require that these conditions be taken into account, and thus a similarly responsive action is required in a mechanical device properly simulating the customary technique of clutch control for smoothly starting a vehicle under actual operating conditions encountered in practice. Further, in such devices having inertia, responsive to vehicle acceleration for controlling clutch engaging movements, heretofore disclosed, response to inclination of the vehicle has usually been undesirable in the structures disclosed, and attempts have been made to eliminate this response at the expense of sensitivity of the resultant device. Even when so desensitized to inclination response, these devices heretofore disclose pendulums free to oscillate without any direct control of the clutch controller or accelerator upon them, and there is thus no positive and direct control of the clutch checking operation present upon the foot-accelerator or the clutch controller, other than actual disengagement of the clutch; and there is no regulation positively provided for the amount of engine power initially applied to the driving side of the clutch, notwithstanding the wide variation of load conditions to be met. Thus, with devices of this character, wherein the amount of engine power employed is optional in starting, the power applied may be inadequate, as for example upon an up-grade or with heavy load upon a level, resulting in a jerk, and possible engine stalling, notwithstanding the provision of an inertia device for checking clutch engaging movements.

These same conditions above enumerated, apply also where torsionally operated pendulums are employed, driven for example from the drive-shaft, and controlling a clutch checking operation after a clutch engaging operation has been initiated, for example by a minimum movement of the accelerator, beyond which power applied initially at clutch engaging position is optional, there being no provision in devices of this character heretofore disclosed for regulating the minimum amount of power initially applied in the starting operation in relation to load conditions.

Having pointed out certain important features of this invention, and with reference to other devices of this character, further details and other important features will be apparent by reference to the drawing, in which Fig. 1 shows a diagrammatic side-view of the several elements of the starting-power control mechanism constituting one embodiment of the invention, and shown partly in section.

Fig. 2 shows a diagrammatic side-view, partly in section, of another form of the invention, showing another arrangement of control member for controlling the clutch, and of the inertia means for regulating engine-power and clutch engagement.

Fig. 3 shows in further detail means for adjusting the pendulum arm or arms.

Referring to the drawing, at 18 is an internal combustion engine for propelling the vehicle, the forward end of the vehicle being indicated by the arrow 58, which is along a longitudinal axis of the vehicle. At 12 is a carburetor, having the throttle-valve 11 for controlling the power of the engine, and the operating lever 13 for 11, limited for idling power by the screw 14. At 17 is a manifold, it being understood that a substantially reduced pressure, below atmospheric pressure, exists in 17, particularly for positions of 11 near the idle power position.

At 38, are floor-boards of the vehicle, and at 35 is a conventional clutch control pedal capable of engaging the end 40 of the fork 42. This invention is not concerned with specific structures of vehicle clutch, however for purposes of illustration a common type of clutch is shown, having frictional plates 45, 46, capable of being normally engaged by the spring 44. It is understood for purposes of this invention, that the force holding 45 and 46 in engagement, and coupling the driving side 47 with the driven side 43, is controllable by a lever or clutch-controller such as 42, acting for example upon a collar 42a. At 36 is a spring, for positively returning the clutch pedal 35 to its normal position, independent of lost-motion encountered by co-action of 35 with 40—42. At 9c is a cylinder, having the piston 10, and piston-rod 32 slidable through a leak-proof bearing 31, the piston-rod being pin-connected at 32a with the arm 39. The arm 39 is free to turn about the pivot 41, as is also the pedal 35 and fork 42, and 39 is capable of connecting with the end 40 of 42, for controlling disengagement and engagement of the clutch. At 27 is an opening connecting with one end of the cylinder 9c, and at 26 is an opening connecting with the opposite end of the cylinder 9c. The cylinder 9c is supported at one end by the pivot 29, and support 30, which support is fastened to the vehicle frame-work.

At 60 is a valve-casing, and slidable in one part of the valve-casing 60 is the control member 6, which is a cylindrically-shaped rod having the flattened portions 6a and 6c. The casing 60 has the ports 52, 52a, 51, and 48. At 50 is a reduction in diameter of the control member 6, forming a cylinder whose length is equal to the diameter of the ports 48, 51. Connected with the control member 6, is the accelerator pedal 37, connected by the rod 33. The accelerator pedal 37 is returned to a normal position by the spring 34, in which position the member 50 registers with the ports 48 and 51, said registering being enforced by the pin 6b, in 6. In this normal position of the control member 6, the port 51 is connected with 48, and atmospheric air previously in the compartment 9b is reduced in pressure by suction through the conduit 49 and conduit 15 leading to the manifold 17. The flattened portions 6a and 6c, together with the valve-casing 60, form the atmospheric ports 57 and 57a, respectively. For a small displacement to the left of the control member 6, the suction is cut off from the compartment 9b, and the port 52a is cut off from atmospheric air. The accelerator pedal and rod 33 are connected to control the engine power of the engine 18, in the following manner. At 16 is a rod connected with the operating lever 13, and with one arm of the bell-crank 20. The bell-crank 20 is pivoted at 21 upon the bearing member 22, and the other arm of the bell-crank is connected by the link 24 to the rod 33. The link 24 is pivotally connected both to 33 and to the lower arm of the bell-crank 20, and has the screw 23 adjustable so that link 24 does not engage said lower arm until after port 51 has been closed by motion of 6 to the left. The spring 19 serves to return the operating lever 13 to the idling position.

At 7 is a throttle-valve, capable of tightly closing the port 52 for pressures in compartment 9 in excess of atmospheric pressure. The throttle-valve 7 is rigidly connected with the slidable stem 7b, which is slidable in the bearing 55. The bearing 55 is supported by the bracket 56, which is a part of the valve-casing 60, and the bearing 55 supports the bracket 54, Fig. 1. At 7f is a pin, capable of limiting the longitudinal movement of 7b. Pivoted at 7a upon the stem 7b, is the pendulum 1 which carries the arms 1f and 1g. Stops 1j, limiting the extreme swings of the pendulum 1 are provided upon an extension of the bracket 56. The arm 2 is held against the arm 1f or 1g, or against both 1f and 1g, by means of the spring 3, the actual contact being upon rollers pivoted at 1b and 1c of the arms 1f and 1g respectively. The arm 2 is pivoted at 2a upon the bracket 54, and the spring 3 is securely fastened at one end to arm 2, and at the other end to the control-rod 4a, the control-rod being threaded, and longitudinally movable through the bracket 54, the adjustment 4 serving to adjust the tension of the spring 3. At 5, is a contact-member, securely fastened to the control member 6, and adjustable as to length by the screw thread and nut 5a.

The operation of the device illustrated in Fig. 1, is as follows: When the accelerator is released, and in its normal position, and the engine idling, the compartment 9 has free communication through 26, 53 and port 57 to the atmosphere, permitting atmospheric air to be drawn into 9 as the suction from 17 through 15 and 49 and 27 moves the piston 10 to the left, and disengages the clutch plates 45, 46. When the accelerator is depressed, the suction is cut off at 51, and the port 52a is also closed. Atmospheric air is thus confined within the compartment 9, and connected conduit 53, and ports 52, 52a. By means of the spring 3, and adjusting means 4 upon the control-rod 4a, the spring tension may be adjusted so that the throttle-valve 7 holds against increased pressures which result in 9, as a consequence of the compression caused by clutch engaging force upon the piston 10. An equilibrium position comes about, and the piston 10 comes to rest when the increased pressure in 9 acting upon the area of the piston 10 is sufficient to counteract the clutch engaging force. The spring 3 may be adjusted to hold the clutch plates at a position of impending contact, or may be adjusted to permit a small leakage at these pressures, and a slow drift of the piston 10 toward clutch engagement after the initial rapid compression has brought the piston nearly to a static equilibrium within the cylinder 9c. The piston 10 will thus be brought to a position such as 10a, somewhere between the disengaged position 10 and the compression end of the cylinder 9c, the small additional displacement to the left of the control member 6 as shown, connecting a free flow of atmospheric air by way of 6c to the conduit 49, and the suction side of the cylinder 9c, that is to the compartment 9b; thus permitting the above-mentioned equalizing to take place. The screw 23 may be adjusted so that for larger displacements to the left of the control member 6, the accelerator 37 begins to move the control arm 13, and increase the power of the engine 18. The remaining distance between 5 and the arm 2, which exists, and must be traversed before the arm 2 can be displaced by the contact-member 5, is adjustable by 5 and 5a, and can be adjusted to permit a desired increase of power of engine 18, before the clutch engagement is begun by removing the arm 2 from contact with the rollers upon 1b, or 1c. This adjustment is preferably made with the vehicle unloaded, upon a level plane. As the accelerator is further depressed, and the contacting of 5 and 2 removes the holding force upon the throttle-valve 7, the clutch is gradually engaged, and sufficient power is applied at the driving side 46 of the clutch to prevent stalling, the pendulum 1 being capable of acting to close the valve 7 and check clutch closure, by an inertia force set up through vehicle acceleration. When the vehicle is being started upon an up-grade, because of the downward component of the weight of the vehicle, the torque which must be supplied to the clutch is larger, for a certain torque must be supplied simply to hold the car in addition to the torque required to accelerate the car or vehicle, and thus a fixed engine speed-pattern or a fixed carburetor throttle opening is inadequate to smoothly start a vehicle. The pendulum 1, now acts through gravity by reason of the pendulum being attached to a vehicle upon an up-grade, to exert force upon 2, by either the roller upon 1b, or upon 1c, and in depressing the accelerator 37 the engine power of 18 will have to be increased a further amount with reference to the amount of increase upon a level, before 5 will remove from 2 the force upon the throttle-valve 7, and initiate clutch engagement, and as before, the pendulum 1 is responsive to vehicle acceleration for closing the throttle-valve 7 and checking further clutch engagement.

It will be noted that the above-described function is effective whether starting upon a level plane, in the forward or rearward direction, or when starting upon an up-grade, either in starting forward upon the grade or in backing up the grade, and that in every instance the throttle-valve 7 is under the control of the accelerator 37, either for checking clutch closure or for engaging the clutch.

Referring to Fig. 3, further details are shown of adjustable arm for use with the pendulums of Figs. 1 and 2, providing means for independently setting the angular displacement and radial length of the arms, such as 1f, 1g. At 7k is a hole capable of fitting over the pivot 1a, the hole 7k being in the member 64, which member has a slot 62 concentric with the pivot hole 7k. An integral part of 64, is shown at 66, in the form of a fork-member having a slot 67. The roller-carrying member 1f, is a separate member, having a slot 63, and roller 1k with pivot 1b. By means of screw-bolts such as 65, the arm 1f is adjustably fastened to 66, and 64 is in turn adjustably fastened to the pendulum 1, for example by screw 67. Similar adjustments are provided for the arms 1g, or 1e. By means of the adjustments provided, the angular displacement of 1g may be initially different from the angular displacement of the arm 1f, and the sensitivity of the reverse action of the pendulum varied in relation to the direct action, and similarly the radial lengths of the arms 1f, 1g, may be varied so that the arm 2 need not be initially in a vertical direction.

Referring to Fig. 2, a modification of the device of Fig. 1 is shown, in which the pendulum 1 is suspended from the arm 2, by the pivot 2c. The arm 2 in this case is held by the spring 3 against the head 7d of the throttle-valve 7, and the pendulum has the arm 1e with roller upon the pivot 1d, capable of being engaged by the contact-member 5d. The member 5d is adjustably fastened to the control member 6 by means of the screw 5e. In operation, the spacing between the roller upon 1d and the contact-member 5d is adjusted so that after air has been admitted to the suction side of the cylinder 9c at 9b, there is still a gap, and that before 5c can act upon the pendulum 1 the engine power of 18 is increased above idle-power. Further motion to the left of the control member 6, relieves the holding force upon the throttle-valve 7, and begins starting the vehicle forward. Upon an up-grade, the pendulum swings so as to increase the distance between 1d and 5c, and before the arm 2 can be acted upon to permit clutch engaging movement the engine-power of 18 will be increased with reference to its former value, the amount of increase depending upon the extent of the grade. Either upon a level or an up-grade, forward acceleration of the vehicle 5 acting upon pendulum 1 will exert a rearward force upon the pendulum, acting to turn the arm 1e away from the contact-member 5c, and to check clutch engaging movement. This checking action however, will only take place for magnitudes of vehicle acceleration in excess of a predetermined desired value, for the pendulum 1 will be lifted a predetermined controllable amount by 5c to remove the clutch-checking force upon 7d, and only accelerations capable of swinging a pendulum a further angle will operate to check the clutch closing.

The above described modification is suitable for controlling the vehicle only for forward elevation of the vehicle and forward acceleration of the vehicle, and Fig. 1 above described is therefore a preferred embodiment of my invention.

Referring further to the disclosures, it will be noted that when the vehicle is upon a level, loading of the vehicle usually results in inclining the vehicle rearwardly because of the load, that is in elevating the vehicle forwardly as in proceeding forward upon an up-grade, and that the device will thus compensate for this condition by regulating the engine-power of 18 to a correspondingly greater value for initially engaging the clutch to start the vehicle. The pendulums are understood to be mounted about a horizontal-transverse axis, upon the vehicle, the longitudinal axis of the vehicle being parallel to the arrow 58, which indicates the direction of the front of the vehicle.

The devices described are thus capable of regulating engine-power initially applied to the clutch-plates for starting in relation to vehicle load conditions, and are capable of checking clutch closing movement for vehicle accelerations in excess of a predetermined desired value, either by applying the required checking force upon the throttle 7 directly, or by action of the inertia member in moving out of contact with the contact-member and permitting the required checking force to be applied upon the throttle-valve 7, and the clutch-checking operation is continuously controllable by the accelerator 37.

Having thus described several illustrative embodiments of my invention, it will be evident that changes can be made in the form and arrangements of parts without departing from the spirit of my invention, as set forth in the appended claims, and I do not therefore limit the scope of the invention to such particular embodiments, or otherwise than by the terms of the appended claims.

What is claimed is:

1. In a motive-power control system for motor vehicles, the combination with an engine for propelling the vehicle, a power-transmission including a clutch, a power-controller for said engine, and engine-power operable means responsive to said power-controller for disengaging said clutch, of a throttle-valve capable of checking the engaging movement of said clutch, a holding means holding said throttle-valve in a closed position, means capable of displacing said holding means, and of urging said throttle-valve toward a closed position responsively with forward and rearward elevation and acceleration of said vehicle, and means for directly acting upon said holding means by said power-controller to permit said throttle-valve to open to engage said clutch, for determining application of vehicle-motive power to said transmission to smoothly start said vehicle in accordance with grade-modified load conditions of said vehicle.

2. In a motor-vehicle, a motive-power control system having an engine for propelling said vehicle, a power-transmission including a clutch, a power-controller for said engine, an engine-power operable means responsive to said power-controller for disengaging said clutch, a throttle-valve capable of checking the engaging movement of said clutch, holding means holding said throttle-valve closed, including means capable of impelling said throttle-valve toward closed position responsively with forward elevation and acceleration of said vehicle, and means for directly displacing said holding means by said power-controller to permit said throttle-valve to open and engage said clutch, for determining application of vehicle-motive power to said transmission to smoothly start said vehicle in accordance with grade-modified load conditions of said vehicle.

3. In a motor vehicle, a motive-power control system having an engine for propelling said vehicle, a power-transmission including a clutch, a power-controller for said engine, engine-power operable means responsive to said power-controller for disengaging said clutch, a primary means checking the engaging movement of said clutch, means for directly opposing said primary means by an amount of displacement of said power-controller to permit engaging movement of said clutch, and a secondary means co-acting upon said primary means responsively with forward and rearward elevation and acceleration of said vehicle for modifying the amount of said displacement and checking the engaging movement of said clutch, whereby the vehicle motive-power applied to said transmission is regulated for grade-modified load conditions of said vehicle, to smoothly start said vehicle.

4. In a motor vehicle, the combination with an engine for propelling said vehicle, a power-transmission including a clutch, a power-controller for said engine, and an engine-power operated means responsive to said power-controller for disengaging said clutch, of a throttle-valve, a spring-actuated means for holding said throttle-valve closed to check engaging movement of said clutch, a contact-member, an inertia member operatively connected with said spring-actuated means modifying a distance between said contact-member and a part of said inertia member responsively with forward elevation and acceleration of said vehicle, and an operative connection of said contact-member with said power-controller for moving said contact-member through said distance to engage said part and permit engaging movement of said clutch, for regulating vehicle motive-power applied to said transmission to smoothly start said vehicle under grade-modified load conditions.

5. In a motive-power control system upon a motor vehicle, the combination with an internal combustion engine for propelling said vehicle, a power-transmission including a clutch for transmitting power to said vehicle, and an accelerator for controlling power of said engine, of means responsive to actuation of said accelerator for controlling disengaging and engaging movements of said clutch, including an inertia means regulating the vehicle-motive power transmitted by said clutch for starting said vehicle responsively with amounts of forward and rearward elevation of said vehicle, and governing engaging movements of said clutch responsively with forward and rearward acceleration of said vehicle.

6. In a motive-power control system of the character set forth in claim 5, said inertia means including a weight pivotally mounted upon a horizontal transverse axis upon said vehicle.

7. In a clutch control system for motor vehicles, the combination of an internal combustion engine for propelling said vehicle, a power-transmission including a clutch for transmitting power to said vehicle, an accelerator for controlling power of said engine, and means responsive to actuation of said accelerator for controlling disengaging and engaging movements of said clutch, including means regulating the amount of vehicle-motive power transmitted by said clutch for starting said vehicle responsively with the amount of forward and rearward elevation of said vehicle, governing vehicle-starting operation of said clutch for smoothly starting said vehicle.

8. In a clutch control system for motor vehicles, the combination of an engine for propelling said vehicle, a power-transmission including a clutch for transmitting power to said vehicle, a power-controller for said engine, engine-power operable means responsive to said power-controller for controlling disengaging and engaging movements of said clutch, and an inertia-control device pivotally mounted upon said vehicle, operative to regulate the minimum amount of vehicle-motive power initially applicable to the driving side of said clutch responsively with grade-modified load conditions of said vehicle, and operative to check clutch engaging movement of said clutch responsively with longitudinal acceleration of said vehicle, to smoothly start said vehicle.

9. In a clutch control system of the character set forth in claim 8, said inertia control device being controllable by direct action thereon of said power-controller.

10. In a motor vehicle, in combination, an engine for propelling the vehicle, a power-transmission including a clutch for transmitting motive power to said vehicle, and an inertia-control device determining minimum amounts of vehicle-motive power initially applicable to the driving side of said clutch responsively with grade-modified load conditions of said vehicle, and checking engaging movements of said clutch responsively with longitudinal accelerations of said vehicle, for determining smooth starting of said vehicle under said varying load conditions.

11. In a motor vehicle, in combination, an engine for propelling said vehicle, a power-transmission including a clutch for transmitting motive power to said vehicle, and an inertia-governor means determining minimum amounts of vehicle-motive power initially applicable to the driving side of said clutch proportionally with amounts of longitudinal inclination of said vehicle, including means modifying engaging movements of said clutch responsively with longitudinal acceleration of said vehicle, to determine smooth starting of the vehicle under grade-modified load conditions.

12. In a motor vehicle, the combination of an engine for propelling said vehicle, a power-transmission including a clutch for transmitting motive power to said vehicle, and an inertia-governor regulating minimum amounts of vehicle-motive power initially applied through said clutch proportionally with amounts of forward and rearward elevation of said vehicle, and regulating engaging movements of said clutch responsively with forward and rearward acceleration of said vehicle, for determining smooth starting of said vehicle.

13. In a motor-vehicle, the combination with the vehicle-propelling motor and a normally engaged clutch for interconnecting said motor and the driving wheels of said vehicle, of a vacuum-operated motor for disengaging said clutch, a throttle-valve connected with said vacuum-motor, a closing means for normally holding said throttle-valve in closed position, an inertia-member operatively connected with said throttle-valve, and means connected with the accelerator of said vehicle-propelling motor for directly acting upon said closing means, for controlling the opening of said throttle-valve.

14. In a motor-vehicle, in combination with a vehicle-propelled motor, a normally engaged clutch for coupling the vehicle with said motor, and a vacuum-operated motor for disengaging said clutch, a throttle-valve connected with said vacuum-operated motor, a closing means for holding said valve in a normally closed position, an inertia-member operatively connected with said closing means, and means connected with the accelerator of said vehicle-propelling motor for directly acting upon said inertia-member, for permitting an amount of opening of said throttle-valve.

15. In a motor-vehicle, in combination with a fluid-displacement device for determining the amount of coupling of the vehicle-propelling motor with the driving wheels of said vehicle, a control device having a throttle-valve connected with said fluid-displacement device, a closing means for holding said valve in a normally closed position, an inertia-member operatively connected with said throttle-valve, and means connected with the accelerator of said vehicle-propelling motor for directly acting upon said closing means, for controlling an amount of opening of said throttle-valve.

EDWARD H. LANGE.